United States Patent
Zhuravlev et al.

(10) Patent No.: US 11,773,998 B2
(45) Date of Patent: Oct. 3, 2023

(54) SINGLE-ACTION EMERGENCY THERMAL VALVE

(71) Applicants: Joint-Stock Company Engineering company ASE, Nizhniy Novgorod (RU); Joint Stock company ATOMENERGOPROEKT, Moscow (RU); Joint Stock Company «Science and Innovations», Moscow (RU)

(72) Inventors: Nikolay Yur'evich Zhuravlev, Belgorodskaya obl. (RU); Igor Ivanovich Shmal, Moskovskaya oblast (RU)

(73) Assignees: Joint-Stock Company Engineering Company ASE, Nizhniy Novgorod (RU); Joint Stock Company Atomenergoproekt, Moscow (RU); Joint Stock Company "Science and Innovations", Moscow (RU)

( * ) Notice: Subject to any disclaimer, the term of this patent is extended or adjusted under 35 U.S.C. 154(b) by 0 days.

(21) Appl. No.: 16/081,639

(22) PCT Filed: Oct. 24, 2017

(86) PCT No.: PCT/RU2017/000776
§ 371 (c)(1),
(2) Date: Aug. 31, 2018

(87) PCT Pub. No.: WO2019/045592
PCT Pub. Date: Mar. 7, 2019

(65) Prior Publication Data
US 2021/0180709 A1    Jun. 17, 2021

(30) Foreign Application Priority Data

Sep. 4, 2017   (RU) ................................ 2017131093

(51) Int. Cl.
*F16K 17/40* (2006.01)
*F16K 17/00* (2006.01)
*F16K 17/38* (2006.01)

(52) U.S. Cl.
CPC .............. *F16K 17/40* (2013.01); *F16K 17/00* (2013.01); *F16K 17/383* (2013.01)

(58) Field of Classification Search
CPC ......... F16K 17/40; F16K 17/383; F16K 17/00
(Continued)

(56) References Cited

U.S. PATENT DOCUMENTS 1,557,250 A * 10/1925 Grandfield ............ F22B 37/475
                                                        122/504.1
1,925,007 A *  8/1933 Rowley ................ A62C 35/605
                                                        169/42

(Continued)

*Primary Examiner* — Minh Q Le
(74) *Attorney, Agent, or Firm* — J. Miguel Hernandez; James R. Gourley; Carstens, Allen & Gourley, LLP

(57) ABSTRACT

The single-action emergency thermal valve comprises a body with a through channel for coolant supply through its inlet in the direction of its outlet, and a fuse link in the through channel of the body; the fuse link consists of at least two parts, each of the two parts completely overlaps the section of the through channel, the parts are made of materials with different melting points, and are located in the through channel in series with the increase of the melting temperature of each successive part in the direction from the through channel inlet to its outlet, wherein the body can have transverse ribs and/or transverse ridges at the location of the fuse link.

3 Claims, 1 Drawing Sheet

(58) Field of Classification Search
USPC .............. 137/74, 68.11, 68.12, 72, 457, 468
See application file for complete search history.

(56) References Cited

U.S. PATENT DOCUMENTS

| | | | | |
|---|---|---|---|---|
| 3,200,987 | A * | 8/1965 | Cunningham | B60C 23/0496 |
| | | | | 220/89.4 |
| 3,269,402 | A * | 8/1966 | Horner | F16K 17/14 |
| | | | | 137/74 |
| 3,927,791 | A * | 12/1975 | Hershberger | F22B 37/46 |
| | | | | 220/89.4 |
| 4,232,796 | A * | 11/1980 | Hudson, Jr. | F16K 17/383 |
| | | | | 137/72 |
| 4,628,953 | A * | 12/1986 | Correll | B64C 25/36 |
| | | | | 137/74 |
| 4,744,382 | A * | 5/1988 | Visnic | F16K 17/003 |
| | | | | 137/68.23 |
| 4,744,383 | A * | 5/1988 | Visnic | F16K 17/383 |
| | | | | 137/72 |
| 4,989,627 | A * | 2/1991 | McAfee | B64C 25/36 |
| | | | | 137/72 |
| 5,791,367 | A * | 8/1998 | Hackman | F16K 17/383 |
| | | | | 220/89.4 |
| 6,006,774 | A * | 12/1999 | Lhymn | F16K 17/383 |
| | | | | 137/72 |
| 6,250,326 | B1 * | 6/2001 | Kimball | A62C 2/242 |
| | | | | 137/75 |
| 8,733,382 | B2 * | 5/2014 | Suess | F16K 17/383 |
| | | | | 137/68.12 |
| 2018/0106389 | A1 * | 4/2018 | Vandrak | F16K 31/1221 |

\* cited by examiner

SINGLE-ACTION EMERGENCY THERMAL VALVE

CROSS-REFERENCE TO RELATED APPLICATIONS

This application is a US 371 Application from PCT/RU2017/000776 filed Oct. 24, 2017, which claims priority to Russia Application 2017131093 filed Sep. 4, 2017, the technical disclosures of which are hereby incorporated herein by reference.

FIELD OF THE INVENTION

The invention relates to mechanical engineering, namely to emergency single-action thermal valves with a breakable insert, and can be used in metallurgy, oil, gas and nuclear industry, in particular at nuclear power plants, and in other fields of technology, in cases of need for supplying coolant to a volume with high thermophysical parameters in emergency situations.

BACKGROUND OF THE INVENTION

A thermal valve is known that comprises a locking device and a fuse link, which, if necessary, operates in a predetermined temperature range (RF patent 2149303, priority 23 Nov. 1991, IPC:F16K17/40).

This valve shall operate reliably in emergency conditions with the temperature increase above the permissible value, however, due to the use of a ball as the locking element, the flow of the medium through the valve is limited and not stable.

A thermal valve is known that consists of two axially mounted spring-actuated rods, a fuse link, a pressing pad and a retainer that connects the adjacent ends of the first and second rods (patent GB 2342709, publication on 19.04.2000, IPCF16K17/40).

The disadvantage of this technical solution is low reliability of operation of this valve, since the fuse link is remote from the monitored zone and located in the middle part of the valve body.

The closest analogue of the claimed invention is a single-action emergency thermal valve, advantageously for cooling water supply, that comprises a cylinder-shaped body, wherein the ends are provided with an inlet and an outlet in a cylinder-shaped body, axially installed first and second spring-actuated rods with a fixed flap and a pressing pad for sealing the inlet at the end of the second spring-actuated rod, a fuse link and a retainer connecting the adjacent ends of the first and the second rods; wherein the fuse link is located in a perforated sleeve that is mounted on the wall of the outlet of the cylinder-shaped body; a piston is mounted on the free end of the first rod with the ability of the perforated sleeve insertion; and the retainer consists of a cone located on the end of the first rod with a split spring ring in an open position, a thrust bush for the ring and the shell fixed on the second rod, wherein the ring set in such a way that when the first rod moves, it slides off the cone inside the shell to allow movement of the rods in one direction (patent No. 2469233, application No. 2011145286/06 of 09.11.2011, IPC: F16K17/40-prototype).

The said valve works as follows. The trigger for the emergency thermal valve (cooling water supply mode) is an increase of the temperature in the area of the outlet of the cylinder-shaped body. The temperature should be sufficient to decompose the fuse link, on which the spring-actuated piston leans. The fuse link melts at approximately 600° C. and flows out of the holes of the perforated sleeve; the piston is pressed into the sleeve by the spring and pulls the rod that slides along the sleeve. The open split spring ring of the retainer collides with the end of the sleeve onto the conical trailer, closes and gets inside the shell, releasing the run of the shell with the rod, which in turn triggers the shock expansion of the spring and shifts the shell, which sits on the starting cylinder. Simultaneously, the rod pulls the flap with the pad and opens the inlet for cooling water supply to the equipment. The water runs from the tank and moves through the inlet between the flap seat into the interfin channels delimited by the ribs to the outlet for feeding to the equipment to be cooled.

The disadvantages of this solution are low flow of the coolant in the cooling water supply mode due to the cluttering of the flowing part of the valve with structural elements, the insufficient reliability of the emergency thermal valve operation due to the need for sequential mechanical movements of a number of valve elements to open it, a large amount of periodic standby maintenance work, such as verification of the forces of the springs that are located constantly in a high-loaded state in the standby mode, or their periodic replacement, significant bulkiness of the structure.

SUMMARY

The task of this invention is to develop a design of a single-action emergency thermal valve with high reliability and efficiency, which is achieved by increasing the flow of coolant in the coolant supply mode while maintaining its dimensions and improving the maintainability during operation.

The technical result of this invention is to increase the reliability and efficiency of a single-action emergency thermal valve by increasing the flow of coolant in a coolant supply mode while maintaining its dimensions.

The technical result is achieved when the proposed single-action emergency thermal valve comprises a body with a through channel for coolant supply through its inlet in the direction of its outlet, and a fuse link in the through channel of the body; the fuse link consists of at least two parts, each of the parts completely overlaps the section of the through channel, the parts are made of materials with different melting points, and are located in the through channel in series with the increase of the melting temperature of each successive part in the direction from the through channel inlet to its outlet.

In one embodiment, the body in the location of the fuse link is provided with transverse ribs.

In one embodiment, the body has transverse ridges at the location of the fuse link with a variable cross-section of the through channel in the direction from the inlet to the outlet.

BRIEF DESCRIPTION OF DRAWINGS

The essence of the proposed technical solution is disclosed in FIG. 1, which shows a preferred embodiment of a single-action emergency thermal valve in the rest position in the cross-section, in the standby mode.

Figure 1:
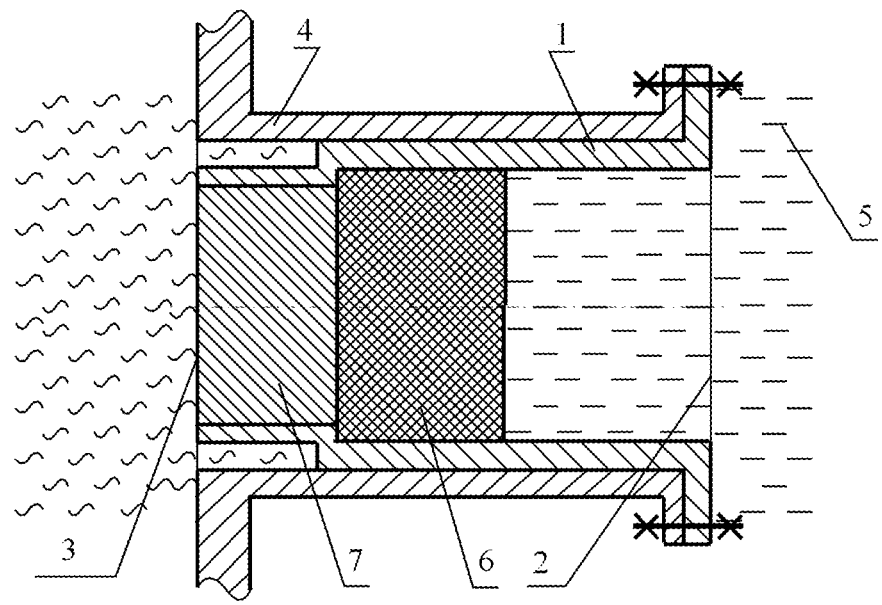

The claimed single-action emergency thermal valve in the preferred embodiment comprises a body 1 disposed and fixed in the room wall 4, with wherein an accident with a sharp increase in thermophysical parameters is possible (at your discretion: in technology they say "fixed to the wall", since below you provide clarifications—the inlet/outlet of the valve, the areas it borders with). A through channel is provided in the body 1 with the inlet 2 and the outlet 3 designed to supply coolant from the container 5 to the area of high thermophysical parameters on the opposite side of the emergency thermal valve in the event of an emergency situation, i.e., exceeding of the design value of the medium temperature near the outlet 3. Inside the through channel, there is a fuse link that consists of the first part 6 contacting with the coolant and the second part 7 of the fuse link that is in contact with the medium with high thermophysical parameters; these parts completely overlap the section of the through channel. Thus, the fuse link consists of two components: the first part 6 and the second part 7 that are located in a direction from the inlet 2 to the outlet 3 and contact each other and the inner walls of the valve body. Wherein the first part 6 of the fuse link is produced from a material with a lower melting point than the second part 7 of the fuse link.

The body 1 can have transverse ridges disposed at the location of the fuse link. The inlet 2 of the through channel of the thermal valve is connected with the coolant in the container 5. The latter contains the required level of liquid maintained to ensure its flow by gravity through the open thermal valve in the event of high thermophysical parameters in the area bordering the outlet 3 of the through channel. The wall 4 of the room, wherein high thermophysical parameters occur in emergency conditions, serves as an obstacle to the spread of the emerging high thermophysical parameters to the environment and adjacent volumes and premises. In addition, the emergency thermal valve is sealed to the wall 4 of the room adapted to be maintained during the service life. A connection with the container 5 with a coolant is provided for the inlet 2 of the emergency thermal valve to allow it performing its functions in the coolant supply mode.

The claimed emergency thermal valve operates in two modes: in standby mode and in the coolant supply mode as follows.

In the standby mode, the thermophysical parameters at the outlet 3 are not high enough to cause the melt of the second part 7 of the fuse-link, which overlaps the cross-section of the through channel and prevents the coolant from flowing out of the container 5. Wherein the fuse link withstands the pressure of the hydraulic coolant column in the container 5, and the calculated shock loads from the outlet 3 due to the adhesion forces connecting the body 1 and the fuse link, and preferably also due to location of the ridges and transverse ribs at the fuse link.

In addition, shock loads such as jumps in the pressure can occur in the standby mode; this is when the emergency thermal valve must ensure the integrity of the structure until the specified thermophysical parameters are reached at the outlet 3, i.e. prevent the flow of the coolant located in the container 5 from the inlet 2 to the outlet 3. Mainly, the second part 7 of the fuse link damps the shock loads; it directly contacts the environment with high thermophysical parameters.

EMBODIMENT

The claimed emergency thermal valve is a passive device that, in accordance with the regulations, is periodically inspected and its emergency thermal valves are replaced. Wherein the embodiment of the emergency thermal valve with a fuse link, which consists of several parts completely overlapping the through channel of the emergency thermal valve, does not comprise moving mechanical devices. This improves the process of maintainability of the valve, simplifies the maintenance procedure and thereby improves the reliability and efficiency of the emergency thermal valve.

The event that triggers the emergency thermal valve, i.e., the transfers it from the standby mode to the coolant supply mode, is the increase of the thermophysical parameters, in particular the temperature, in the vicinity of the outlet 3 of the through channel. The temperature value (hereinafter—"opening temperature"), the excess of which leads to a change in the operating mode of the thermal valve—from the standby mode to the coolant supply mode—is set during the manufacture of the emergency thermal valve by the selection of the materials which the fuse link parts are made of.

The triggering of the emergency thermal valve occurs as follows. After the temperature of the medium at the outlet 3 reaches values equal to or greater than the point of melting and destruction of the second part 7 of the fuse link, the second part 7 of the fuse link melt and destructs. Prior the moment of destruction, the fuse link holds the pressure of the hydrostatic column of the liquid in the container 5 with the coolant, and the process of destruction of the second part 7 of the fuse link is initiated solely by contact with the high-temperature medium at the outlet 3. Wherein the first part 6 of the fuse link serves as a heat insulator that does not allow contact of the second part 7 of the fuse link with the coolant until to the complete melting and destruction of the part 7. This ensures maximum release of the section of the through-channel of the thermal valve, wherein the second part 7 of the fuse link (in standby mode) was initially located, during the opening of the thermal valve—when entering the coolant supply mode.

Figure 2:
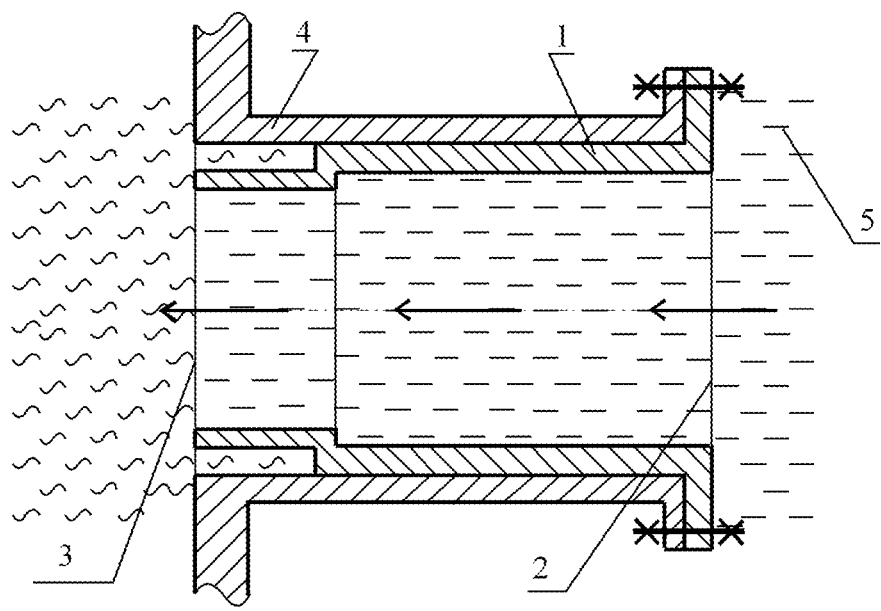
FIG. 2 shows a section of the preferred embodiment of a single-action emergency thermal valve in the coolant supply mode, i.e., after the destruction of the fuse link; the arrows indicate the direction of the coolant movement.

After the second part 7 of the fuse link is destroyed, a direct contact of the high-temperature medium with the first part 6 of the fuse link occurs. The contact of the first part 6 of the fuse link with the medium at high thermophysical parameters and the hydrostatic pressure of the coolant in the container 5 together lead to rapid melting and destruction of the part 6 of the fuse link. The latter is due to the fact that the melting point of the first part 6 of the fuse link is lower than one of the material of the second part 7, and the melting point of the first part 6 of the fuse link is slightly higher than the temperature of the coolant. At the end of fuse destruction, the through channel of the emergency thermal valve from inlet 2 to outlet 3 is free; there are no obstructions to the coolant flow through the emergency thermal valve. Thus, the thermal valve operates in a mode of coolant supply through the full section of the through channel from the container 5 to the area of high thermophysical parameters, as shown in FIG. 2, which ensures high reliability and efficiency of the emergency thermal valve. Once again, we emphasize that the movement of the coolant at the inlet 2 is provided by the excess pressure arising from the existence of the hydrostatic column pressure of the liquid in the container 5.

INDUSTRIAL USE

The increase in the strength of the thermal valve fuse link under conditions of significant pressure drops can be achieved by establishing transverse ribs that increase the strength of the fuse link in the thermal valve standby mode and do not create a significant clogging of the flow section in the coolant supply mode.

The cross section of the through channel of the emergency thermal valve can vary along the axial coordinate of the through channel. This can be provided, for example, by one or more ridges in the location of the fuse link. Wherein the limiting pressure drop for the thermal valve in the standby mode increases when emergency pressure drops occur in the area with high thermophysical parameters, since in this case the fixing of the fuse link, in addition to the adhesion forces arising at the boundary of the fuse link and the body 1, is provided by a mechanical contact of the fuse link with one or more ridges. In a preferred embodiment of the invention, the ridges are located at the second part 7 of the fuse link of the emergency thermal valve.

The claimed design of the emergency thermal valve is made without the use of mechanical components that move when the thermal valve is opening. This allows increasing the reliability of the operation of the thermal valve. This design allows increasing the flow section of the thermal valve with the same dimensions or to reduce the latter at a constant flow rate of the coolant. Optimization of the weight and overall characteristics of the emergency thermal valve also ensures a reduction in the manufacturing cost of the thermal valve.

The claimed emergency single-action thermal valve has high reliability and can be used in metallurgy, oil, gas and nuclear industry, in particular at nuclear power plants, and in other fields of technology, in cases of need for supplying coolant to a volume with high thermophysical parameters in emergency situations.

The invention claimed is:

1. A single-action emergency thermal valve comprises a body with a through channel for coolant supply through its inlet in the direction of its outlet, and a fuse link in the through channel of the body, characterized in that the fuse link consists of at least two parts, each of the parts completely overlaps the section of the through channel, the parts are made of materials with different melting points, and are located in the through channel in series with the increase of the melting temperature of each successive part in the direction from the through channel inlet to its outlet.

2. The single-action emergency thermal valve according to claim 1 characterized in that the body in the location of the fuse link is provided with transverse ribs.

3. The emergency thermal valve according to claim 1 characterized in that the body has transverse ridges at the location of the fuse link.

* * * * *